(12) United States Patent
Lory et al.

(10) Patent No.: US 12,469,863 B2
(45) Date of Patent: Nov. 11, 2025

(54) CONTROL FLAP ASSEMBLY FOR A GAS FLOW IN A FUEL CELL SYSTEM

(71) Applicant: Purem GmbH, Neunkirchen (DE)

(72) Inventors: Markus Lory, Stuttgart (DE); Matthias Grün, Altbach (DE); Andreas Wacker, Plochingen (DE); Jochen Hammer, Stuttgart (DE); Markus Birgler, Wernau (DE); Annika Zeumer, Wernau (DE)

(73) Assignee: Purem GmbH, Neunkirchen (DE)

( * ) Notice: Subject to any disclaimer, the term of this patent is extended or adjusted under 35 U.S.C. 154(b) by 53 days.

(21) Appl. No.: 18/459,106

(22) Filed: Aug. 31, 2023

(65) Prior Publication Data

US 2024/0079614 A1  Mar. 7, 2024

(30) Foreign Application Priority Data

Sep. 1, 2022 (DE) ............... 10 2022 122 103.2

(51) Int. Cl.
*H01M 8/04082* (2016.01)
*F02D 9/10* (2006.01)
*F16K 1/226* (2006.01)
*H01M 8/0438* (2016.01)

(52) U.S. Cl.
CPC ..... *H01M 8/04201* (2013.01); *H01M 8/0438* (2013.01); *F02D 9/1015* (2013.01); *F16K 1/2261* (2013.01); *H01M 2250/20* (2013.01)

(58) Field of Classification Search
CPC .................................................. F16K 1/2261
USPC ......................................................... 251/251
See application file for complete search history.

(56) References Cited

U.S. PATENT DOCUMENTS 4,605,198 A * 8/1986 Greiner ............... F16K 31/5282
                                                          74/25
5,035,214 A    7/1991 Daly et al.
5,098,064 A * 3/1992 Daly .................... F16K 1/2261
                                                          251/306

(Continued)

FOREIGN PATENT DOCUMENTS

DE           195 12 875 A1    10/1996
DE           103 28 246 A1     1/2005
(Continued)

OTHER PUBLICATIONS

English translation of Office action of the Korean Patent Office dated Dec. 13, 2024 in corresponding Korean application 10-2023-0115942.

*Primary Examiner* — Robert K Arundale
(74) *Attorney, Agent, or Firm* — Walter Ottesen, P.A.

(57) ABSTRACT

A control flap assembly for a gas flow in a fuel cell system, in particular in a vehicle, includes a control flap housing providing a gas flow channel, and a control flap with a disk-like control flap body which can be adjusted in the control flap housing between a closed position preventing a gas flow through the gas flow channel and at least one open position opening up the gas flow channel for a throughflow. A control flap seat is provided on the control flap housing, and a sealing region bearing against the control flap seat in the closed position of the control flap is provided on the control flap. The sealing region includes resilient sealing material on an external peripheral region of the control flap body.

11 Claims, 5 Drawing Sheets

(56) References Cited

U.S. PATENT DOCUMENTS

| | | | |
|---|---|---|---|
| 5,106,052 A * | 4/1992 | Datta | F24F 13/1486 |
| | | | 74/57 |
| 2018/0166712 A1 | 6/2018 | Park et al. | |
| 2018/0266567 A1 * | 9/2018 | Hadley | F16K 1/2261 |

FOREIGN PATENT DOCUMENTS

| | | |
|---|---|---|
| DE | 10 2008 018 856 A1 | 10/2009 |
| EP | 336 944 B1 | 6/2018 |
| JP | 2022-21969 A | 2/2022 |
| KR | 20-0334680 Y1 | 11/2003 |

\* cited by examiner

CONTROL FLAP ASSEMBLY FOR A GAS FLOW IN A FUEL CELL SYSTEM

CROSS-REFERENCE TO RELATED APPLICATIONS

This application claims priority of German patent application no. 10 2022 122 103.2, filed Sep. 1, 2022, the entire content of which is incorporated herein by reference.

TECHNICAL FIELD

The present disclosure relates to a control flap assembly for a gas flow in a fuel cell system which can be used, for example, in a vehicle in order to provide electrical energy.

BACKGROUND

In such fuel cell systems, depending on the operating state, it is necessary to conduct different gas flows through or past the anode region or the cathode region of a fuel cell or a fuel cell stack. High demands are placed on the seal of the control flap assemblies which are used for regulating such gas flows in order to ensure that leakage flows can be eliminated or substantially no gas can escape to the environment, in particular in operating states in which a specific gas flow is not configured to be conducted through a fuel cell or past a fuel cell.

SUMMARY

It is an object of the present disclosure to provide a control flap assembly for a gas flow in a fuel cell system, in particular in a vehicle, which can substantially prevent gas leakages by a structurally simple configuration.

According to the disclosure, this object is achieved by a control flap assembly for a gas flow in a fuel cell system, in particular in a vehicle, including a control flap housing providing a gas flow channel, a control flap with a disk-like control flap body which can be adjusted in the control flap housing between a closed position substantially preventing a gas flow through the gas flow channel and at least one open position opening up the gas flow channel for the throughflow, wherein a control flap seat is provided on the control flap housing, and a sealing region bearing against the control flap seat in the closed position of the control flap is provided on the control flap, wherein the sealing region includes resilient sealing material, in particular elastomer material, for example EPDM, on an external peripheral region of the control flap body.

By providing resilient sealing material on the sealing region of the control flap, it can be ensured that a substantially complete seal of the gas flow channel, which is formed in the control flap housing, is achieved against the throughflow of gas, irrespective of production tolerances and also irrespective of thermally induced dimensional changes of the components of the control flap assembly in the closed position.

In order to be able to use the sealing action of the resilient sealing material, in particular where the control flap or the control flap body interacts with the control flap seat, it is proposed that at least one sealing material body, which is constructed with the sealing material, is arranged on the external peripheral region of the control flap body. The control flap body itself can be configured with substantially rigid material, for example plastics or metal, which is resistant relative to the gas to be conducted through the control flap housing.

Since a sealing action has to be provided by the sealing material substantially only where the control flap body interacts with the control flap seat, the at least one sealing material body can be configured to extend in an annular manner along at least one part of the external peripheral region of the control flap body.

The control flap body can have a first front face and a second front face, which faces away from the first front face, and the at least one sealing material body can include a first sealing material body portion which is arranged on the first front face, a second sealing material body portion which is arranged on the second front face and at least one sealing material connecting portion connecting the first sealing material body portion to the second sealing material body portion.

For a stable bond between the two sealing material body portions, it is proposed that the at least one sealing material body includes a plurality of sealing material connecting portions which are arranged successively in a peripheral region about a central region of the control flap along the external peripheral region of the control flap body, and/or in that the at least one sealing material body includes a plurality of sealing material connecting portions which are arranged in a radially staggered manner relative to the central region of the control flap.

Moreover, a stable structure, which also leads to a positive connection between the sealing material body and the control flap body, can also be assisted by the at least one sealing material body being configured in one piece with the first sealing material body portion, the second sealing material body portion and the at least one sealing material connecting portion. It should be mentioned that within the meaning of the present disclosure "in one piece" means that the sealing material body is provided with its different portions as a single material block, that is, monolithically, and not by joining together separately produced components.

This can be achieved, for example, by the at least one sealing material body being configured by being integrally formed on the control flap body.

For a stable attachment of the at least one sealing material body to the control flap body, at least one sealing material connecting portion can pass through an opening in the control flap body and/or at least one sealing material connecting portion can encompass an external peripheral side of the control flap body.

For a further improved sealing action by utilizing the resilience of the sealing material, it is proposed that the at least one sealing material body includes on the first sealing material body portion or on the second sealing material body portion at least one sealing lip extending along the external peripheral region of the control flap body, wherein the at least one sealing lip bears against the control flap seat when the control flap is positioned in the closed position.

In an embodiment of the control flap assembly according to the disclosure which can be implemented in a simple manner, the control flap body can have a first flap vane and a second flap vane, wherein in the closed position of the control flap the first flap vane bears against the control flap seat with the first sealing material body portion which is arranged on the first front face of the control flap body, and in the closed position of the control flap the second flap vane bears against the control flap seat with the second sealing material body portion which is arranged on the second front face of the control flap body.

In order to be able to position in a simple manner the various flap vanes in a defined manner regarding the portions of the control flap seat cooperating therewith, it is proposed that the first flap vane is provided by a first control flap body part and the second flap vane is provided by a second control flap body part which is configured separately from the first control flap body part.

The sealing action of the sealing material to be implemented on the different front faces can be achieved in a simple manner by a first sealing material body being provided on the first flap vane and a second sealing material body, which is configured separately from the first sealing material body, being provided on the second flap vane.

In an alternative embodiment, the sealing material body can extend substantially along the entire external peripheral region of the control flap body, wherein in the closed position of the control flap only the first sealing material body portion which is arranged on the first front face of the control flap body or only the second sealing material body portion which is arranged on the second front face of the control flap body bears against the control flap seat.

For a simply configured construction, the control flap body can be configured in one piece and/or in the form of a circular disk.

In order to be able to move the control flap between the closed position and the at least one open position, it is proposed that the control flap body is borne on a pivoting shaft and that the control flap can be adjusted between the closed position and the at least one open position by rotating the pivoting shaft about a pivoting shaft axis.

The disclosure further relates to a fuel cell system, in particular for a vehicle, including at least one control flap assembly which is constructed according to the disclosure.

BRIEF DESCRIPTION OF DRAWINGS

The invention will now be described with reference to the drawings wherein.

DETAILED DESCRIPTION

Before an embodiment according to the disclosure of a control flap assembly for a fuel cell system is described in detail below, in particular regarding a structure thereof provided for providing a tight seal, the basic construction of a fuel cell system by which electrical energy can be provided in a vehicle is described with reference to FIG. 1, and the basic construction of a control flap assembly by which, in particular assigned to the cathode region of such a fuel cell system, the gas flow can be regulated or the cathode region can be sealed relative to a throughflow, is explained with reference to FIG. 2.

Figure 1:
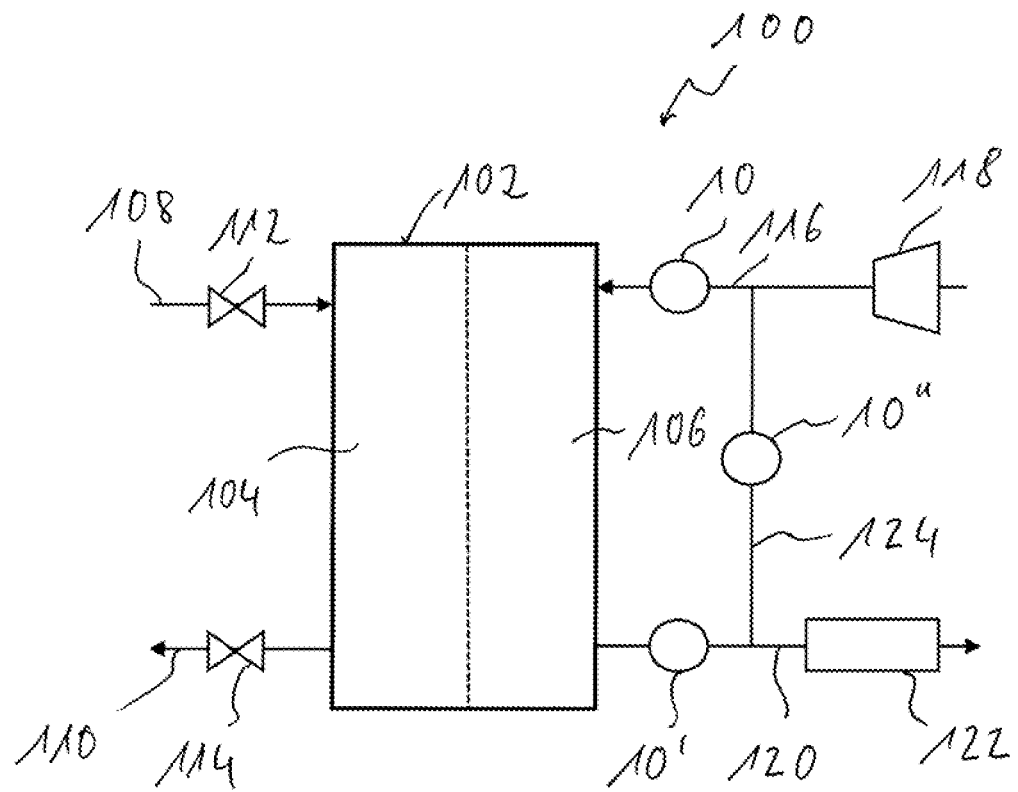
FIG. 1 shows a basic sketch of a fuel cell system of a vehicle.

The fuel cell system 100 shown in FIG. 1 includes as a basic system a fuel cell generally denoted by 102, with an anode region 104 to be supplied with hydrogen or a gas containing hydrogen, and a cathode region 106 to be supplied with oxygen or a gas containing oxygen, for example air.

A supply line 108 and a discharge line 110 with respective valves 112, 114 are assigned to the anode region 104 in order to be able to introduce the hydrogen or the gas containing the hydrogen into the anode region 104 or to be able to discharge anode exhaust gas therefrom, and if required to be able to seal the anode region 104 completely.

Assigned to the cathode region 106 is a supply line 116 via which the gas containing oxygen, that is, for example air, can be introduced therein, for example via a compressor 118 or the like. A control flap assembly, generally denoted by 10, is provided in the supply line 116, the gas flow being able to be regulated thereby via the supply line 116 or the cathode region 106 being able to be sealed thereby in a substantially gas-tight manner in its intake region.

For discharging cathode exhaust gas, a discharge line 120 is assigned to the cathode region 106. This discharge line leads to a fuel cell exhaust gas system 122 in which, for example, water contained in the cathode exhaust gas can be removed via a water separator. Moreover, a further control flap assembly 10' is arranged in the discharge line 120, the discharge line 120 and thus a drain region of the cathode region 106 being able to be sealed in a substantially gas-tight manner.

A bypass line 124 runs between the supply line 116 and the discharge line 120 of the cathode region 106. A control flap assembly 10" is also arranged in the bypass line 124, the gas flow being able to be regulated thereby via the bypass line 124 or the bypass line 124 being able to be sealed thereby in a substantially gas-tight manner.

It should be mentioned that the construction of the fuel cell system 100, shown in FIG. 1 and described above, illustrates only one example of a plurality of different options for the supply and discharge of gas, in particular on the cathode region 106. It is important that at least one control flap assembly 10, 10', 10", optionally a plurality thereof, is provided to be assigned to the cathode region 106, wherein when a plurality of such control flap assemblies 10, 10', 10" are provided, in principle they can be constructed the same as one another or can be differently configured, depending on the region in which they are positioned and which level of gas tightness has to be provided thereby.

Figure 2:
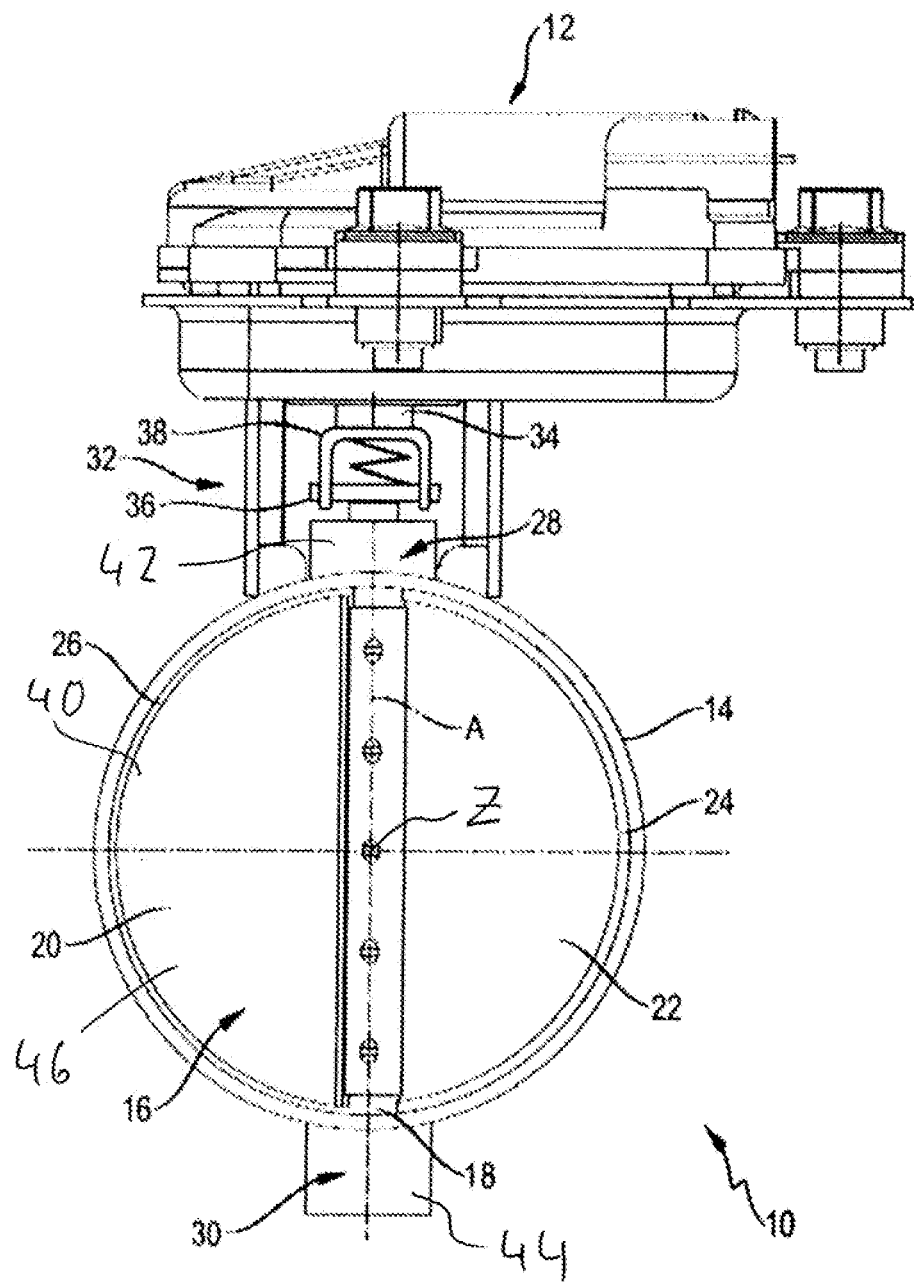
FIG. 2 shows a control flap assembly for a fuel cell system.

The control flap assembly 10 shown in FIG. 2 and used, for example, in the fuel cell system 100 of FIG. 1, includes, for example, an electromotive control flap drive 12 and a control flap, generally denoted by 16, in a control flap housing 14 which is configured in a tubular manner and which surrounds a gas flow channel 46.

The control flap 16 includes a disk-like control flap body 24 which is borne on a pivoting shaft 18 so as to be pivotable about a pivoting shaft axis A, with two control flap body parts 20, 22 providing in each case a flap vane. Assigned to the control flap 16, a control flap seat 26 is provided on the control flap housing 14, the control flap 16 bearing thereagainst in a closed position thereof with a sealing region 40 located radially externally relative to a central region Z of the control flap 16 or the control flap body 24.

For moving the control flap 16 between the closed position and a fully open position, in which the disk-like control flap body 24 is oriented substantially at right angles to the drawing plane of FIG. 2, and thus fully opens up the gas flow channel 46 in the control flap housing 14 for the through-flow, a drive shaft 34 of the control flap drive 12 is coupled for common rotation via a coupling arrangement 32 to the pivoting shaft 18 borne in bearing regions 28, 30 on the control flap housing 14 so as to be pivotable about the pivoting shaft axis A. The coupling arrangement 32 includes, for example, a coupling part 38 which is connected fixedly in terms of rotation to the drive shaft 34, and a coupling part 36 which is connected fixedly in terms of rotation to the pivoting shaft 18 and which is in rotary coupling engagement with the coupling part 38.

Each of the two bearing regions 28, 30 includes a bearing bush 42, 44 which is borne on the control flap housing 14 and which is fixed by welding, for example, to an external peripheral surface thereof, and in which one respective axial end portion of the pivoting shaft 18 is received so as to be rotatable about the pivoting shaft axis A.

Figure 3:
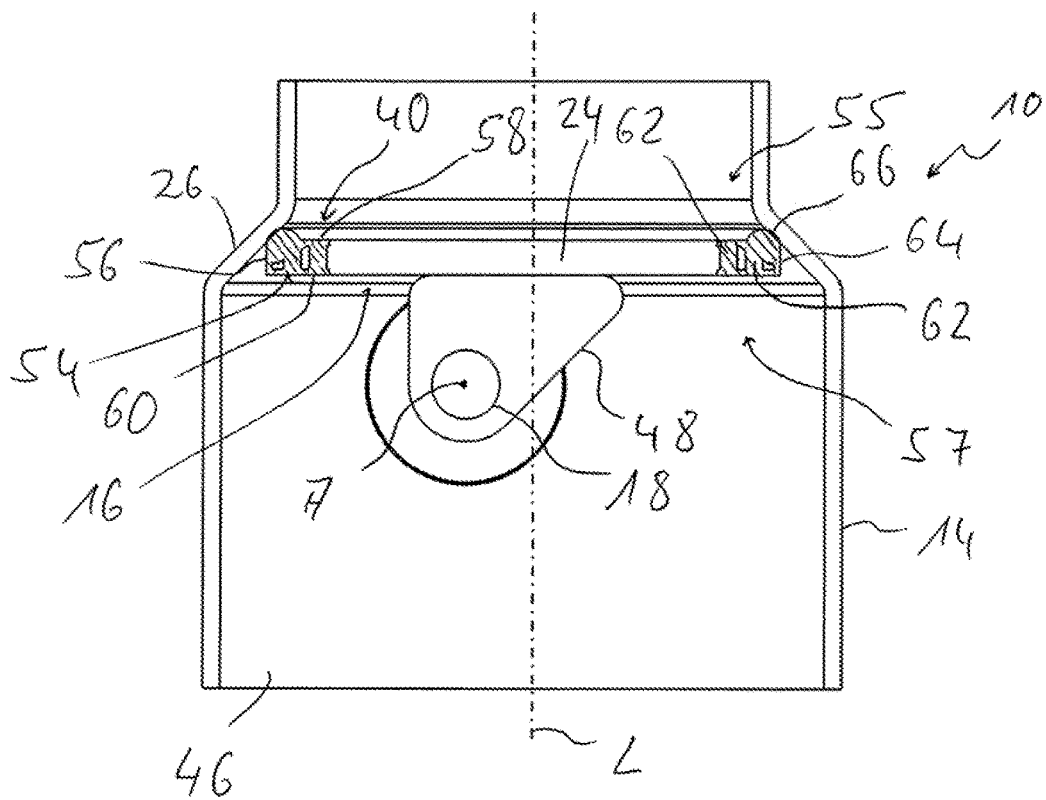
FIG. 3 shows a longitudinal sectional view of a control flap housing with a control flap received therein.
Figure 4:
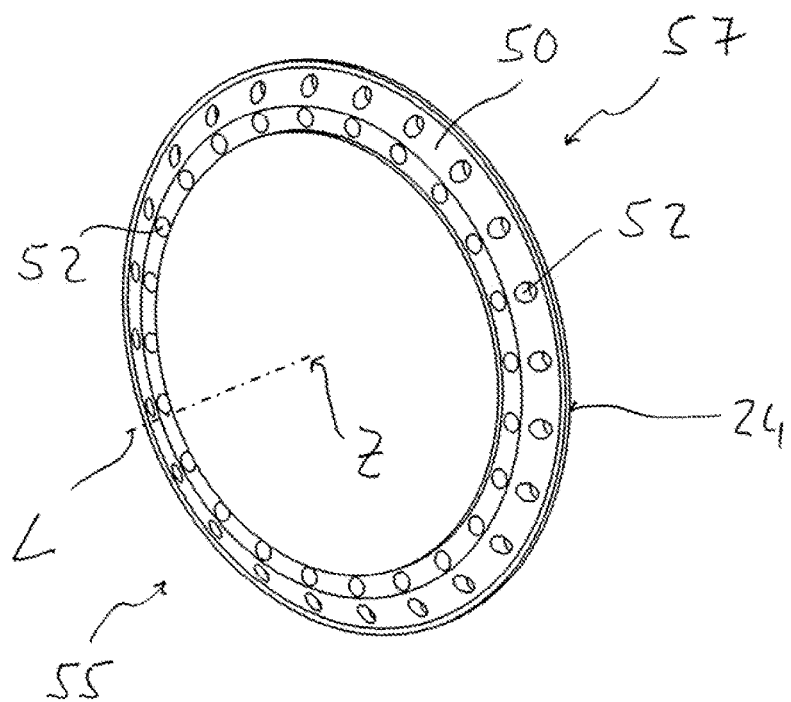
FIG. 4 shows a perspective view of a control flap body of the control flap of FIG. 3.
Figure 5:
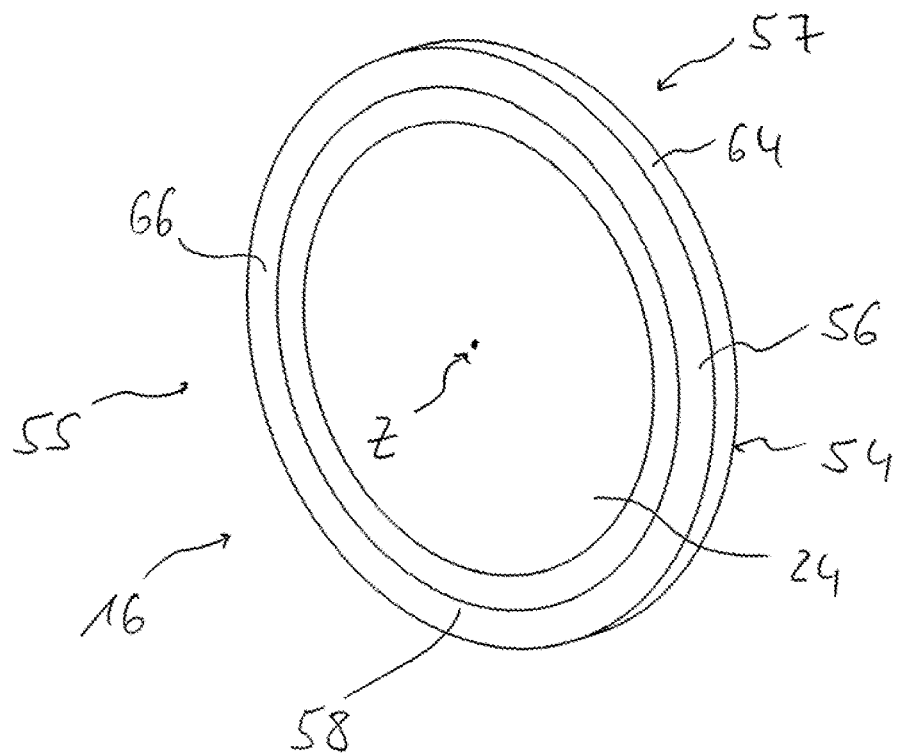
FIG. 5 shows the control flap body of FIG. 4 with a sealing material body arranged on an external peripheral region thereof.

FIGS. 3 to 5 show an embodiment according to the disclosure of a control flap assembly 10 or a control flap 16 therefor. In the construction shown in FIG. 3, the control flap 16 includes a circular disk-like control flap body 24 configured in one piece. This control flap body is borne via a support structure 48 on the pivoting shaft 18 so as to be pivotable about the pivot axis A from the closed position shown in FIG. 3 into an open position. The control flap seat 26, which is provided for cooperation with the control flap 16 on the control flap housing 14, is provided, for example, by a substantially conically tapering portion of the tubular control flap housing 14.

A plurality of openings 52, which in the embodiment shown are arranged in two radially staggered annular formations, is provided on the external peripheral region 50 of the control flap body 24. In particular, the openings 52 are arranged in the external peripheral region 50 of the control flap body 24 in which on a first front face 55 the control flap body 24 is configured to be positioned obliquely from radially inwardly to radially outwardly in the direction of a second front face 57, such that in this external peripheral region 50, or at least one part thereof, the thickness of the control flap body 24 between the first front face 55 and the second front face 57 reduces from radially inwardly to radially outwardly. On the second front face 57, the control flap body 24 can be configured to be substantially planar, for example, over its entire radial extent. The control flap body 24 can be configured to be substantially planar in the manner of a disk in its portion extending from the central region Z to the external peripheral region 50. In the transition to the external peripheral region 50, the control flap body 24 can provide a step-like transition on both front faces 55, 57 such that the thickness of the control flap body 24 reduces radially outwardly in a step-like manner on both front faces 55, 57.

Resiliently deformable sealing material 54, for example elastomer material, such as for example EPDM, substantially providing the sealing region 40 of the control flap 16, is arranged in the external peripheral region 50 of the control flap body 24. The sealing material 54 is provided in the form of an annular sealing material body 56 extending along the external peripheral region 50 and radially covering this external peripheral region. This sealing material body has an annular first sealing material body portion 58 on the first front face 55 and has an annular second sealing material body portion 60 on the second front face 57. The first sealing material body portion 58 and the second sealing material body portion 60 are connected together by a plurality of connecting portions 62 passing through the openings 52. The two sealing material body portions 58, 60 in their external peripheral region are connected together over the entire periphery by a further connecting portion 64 axially encompassing the control flap body 24 radially externally.

The sealing material body 56 is provided, for example, by integrally forming the sealing material 54 on the external peripheral region 50 of the control flap body 24, as a one-piece monolithically constructed material block. The sealing material body 56 is integrally formed on the control flap body 24 radially outwardly adjoining the step-like transitions formed on the two front faces 55, 57, such that on the two front faces 55, 57 the sealing material body 56 adjoins in a substantially stepless manner the surfaces of the portion of the control flap body 24 extending radially inside the external peripheral region 50.

For the sealed interaction with the control flap seat 26 which is provided on the control flap housing 14, a sealing lip 66 which preferably passes without interruption over the entire periphery is provided on the sealing material body 56 on the first front face 55 of the control flap body 24, which is provided for interaction with the control flap seat 26. In the closed position shown in FIG. 3, the sealing material body 56 bears with the sealing lip 66 against the control flap seat 26 or is pressed thereby against the control flap seat 26 such that a substantially perfectly gas-tight seal of the gas flow channel 46 is achieved due to the resilience of the sealing material 54 and thus the deformability thereof.

Figure 6:
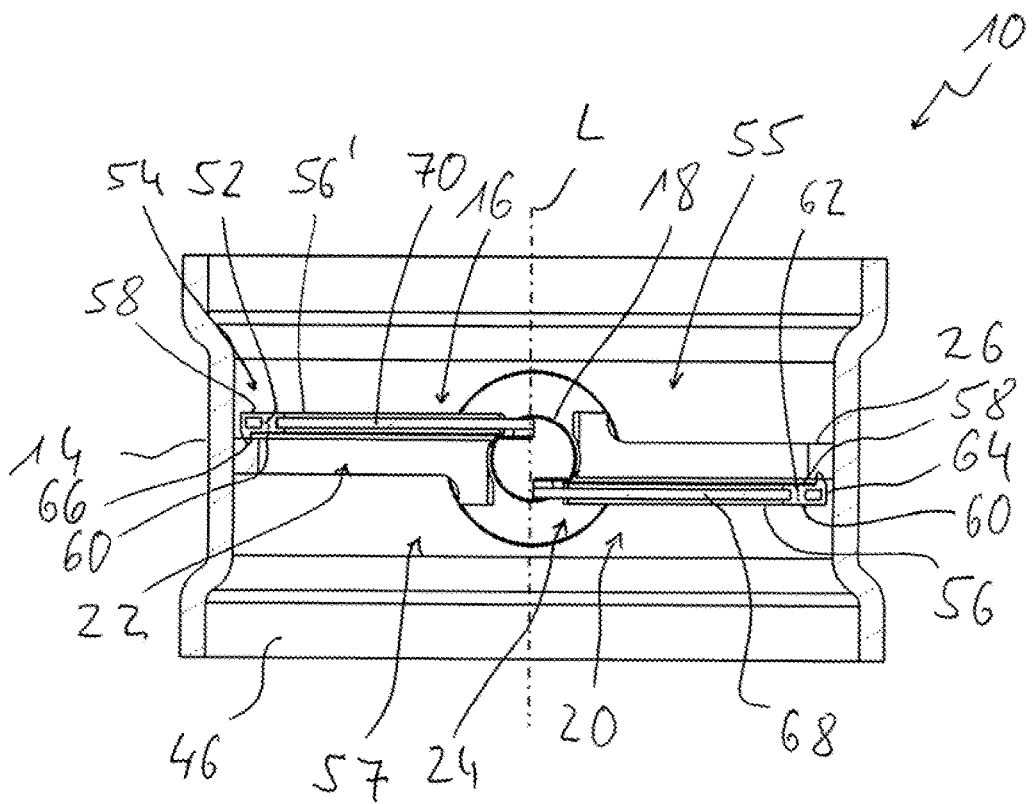
FIG. 6 shows a longitudinal sectional view corresponding to FIG. 3 of a control flap housing with a control flap of an alternative embodiment; and, FIG. 7 shows a control flap body part of the control flap of FIG. 6 with a sealing material body arranged on the external peripheral region thereof.
Figure 7:
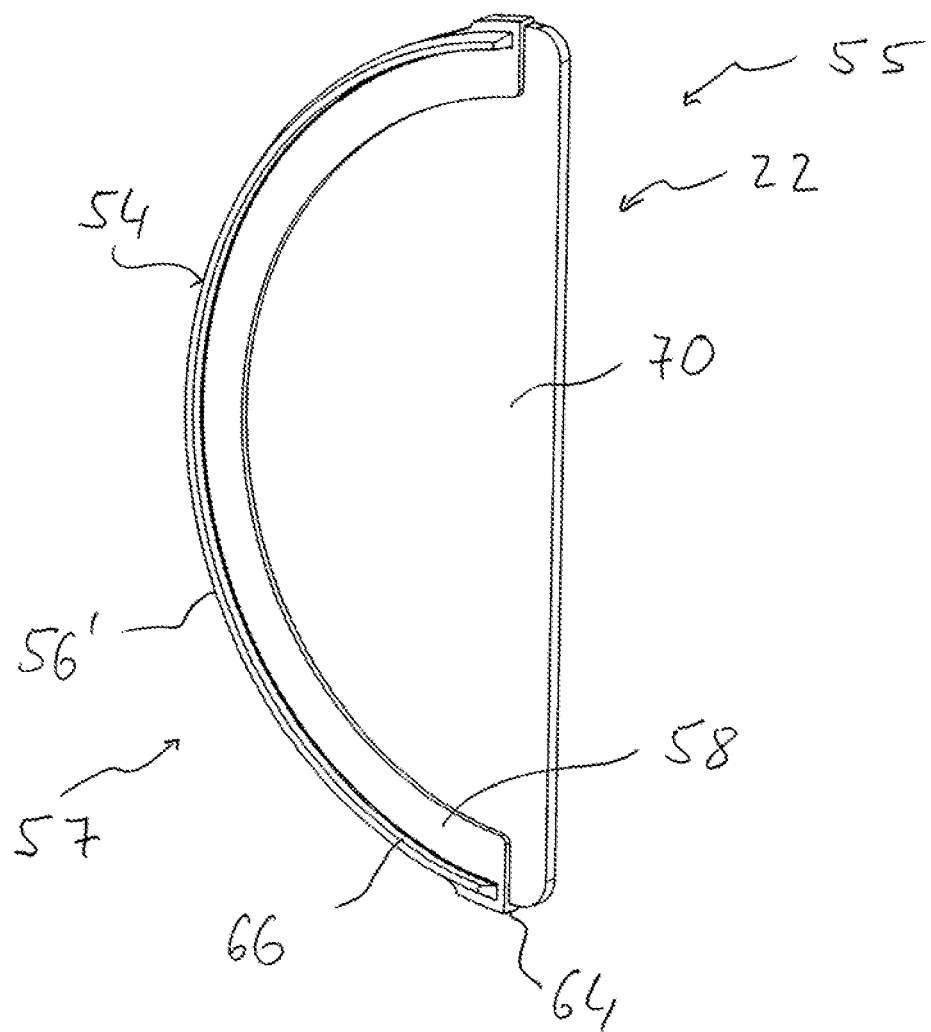

An alternative embodiment of such a control flap assembly 10 is shown in FIGS. 6 and 7. In this embodiment, the control flap 16 has a control flap body 24 constructed with two flap vanes 68, 70, providing in each case a control flap body part 20 or 22. On each of the flap vanes 68, 70, a sealing material body 56 or 56' of the sealing material 54 is provided in the external peripheral region 50 of the control flap body 24 which is constructed with the two flap vanes 68, 70. The first sealing material body 56 provided on the first flap vane 68 extends approximately over the entire portion of the external peripheral region 50 of the control flap body 24 provided on the first flap vane 68, and the second sealing material body 56' provided on the second flap vane 70 accordingly extends approximately over the entire region of the external peripheral region 50 of the control flap body 24 provided on the second flap vane 70. In particular, the two sealing material bodies 56, 56' extend in each case sufficiently far in the peripheral direction that they terminate with their peripheral ends directly adjoining the pivoting shaft 18 such that no intermediate space, which might result in a leakage, remains between the external peripheral region of the pivoting shaft 18 and the sealing material bodies 56, 56'.

Each of the two sealing material bodies 56, 56' can be provided on the respectively assigned flap vane 68, 70, in a configuration corresponding to the embodiment described above with reference to the embodiment of FIGS. 3 to 5, preferably by integrally forming the sealing material 54. As FIG. 6 illustrates, the flap vanes 68, 70 also have the openings 52, the sealing material body portions 58, 60 located on the two front faces 55, 57 of the control flap body 24 being connected together in the connecting portions 62 thereof. Similarly, a connecting portion 64 radially outwardly encompassing the control flap body 24 or one respective flap vane 68, 70 can be provided in order to connect together the sealing material body portions 58, 60 located on the two front faces 55, 57 of the control flap body 24 or the respective flap vane 68, 70.

In particular, in the view of FIG. 6 it can be identified that the two flap vanes 68, 70 are arranged on the pivoting shaft 18 such that they are offset to one another in the direction of a longitudinal axis L of the control flap housing 14, and thus bear against different axial sides of the control flap seat 26 provided on the internal periphery of the control flap housing 14. When the control flap 16 is pivoted from the closed position, shown in FIG. 6, by rotating the pivoting shaft 18 clockwise in FIG. 6, each of the flap vanes 68, 70 moves away from the portion of the control flap seat 26 respectively assigned thereto. Since the two flap vanes 68, 70 move away in substantially opposing directions from the respectively assigned portion of the control flap seat 26, the configuration of the first or second sealing material portions 58, 60 on which the sealing lip 66 can be configured, as already described above, is different on the two flap vanes 68, 70 toward the two front faces 55, 57 of the control flap body 24. While in the control flap vane 68, which can be identified on the right-hand side in FIG. 6, the first sealing material body portion 58 and the sealing lip 66 provided thereon are arranged on the first front face 55, which faces the control flap seat, of the control flap body 24 constructed with the two flap vanes 68, 70, and accordingly the second sealing material body portion 60 is positioned on the second front face 57 of the control flap body 24 which faces away from the control flap seat 26, in the second flap vane 70 shown on the left-hand side in FIG. 6, the first sealing material body portion 58 is arranged on the first front face 55 facing away from the control flap seat 26, and the second sealing material body portion with the sealing lip 66 provided thereon is arranged on the second front face 57 of the control flap body 24 facing the control flap seat 26. This means that in the first flap vane 68 the sealing material 54 or the sealing material body 56 is thus shaped with its first sealing material body portion 58 bearing against the first front face 55 of the control flap body 24, in the same manner that the second sealing material body portion bears against the second front face 57 of the control flap body 24 in the second flap vane 70. This makes it possible to use for the construction of the control flap body 24 two flap vanes 68, 70 which are in principle identically configured or identically provided with the sealing material 54, and to incorporate these flap vanes into the control flap housing 14 in an orientation opposing one another.

In the closed position of the control flap 16 shown in FIG. 6, a substantially perfect gas-tight seal of the gas flow channel 46 formed in the control flap housing 14 is also achieved by the construction of a control flap assembly 10 shown in FIGS. 6 and 7. As set forth in the introduction, this is particularly advantageous or necessary in order to be able to ensure a reliable gas-tight seal, in particular, assigned to the cathode region 106 of the fuel cell 102.

It is understood that the foregoing description is that of the preferred embodiments of the invention and that various changes and modifications may be made thereto without departing from the spirit and scope of the invention as defined in the appended claims.

The invention claimed is:

1. A control flap assembly for a gas flow in a fuel cell system, the control flap assembly comprising:
   a control flap housing defining a gas flow channel;
   a control flap having a disk-like control flap body and being adjustable in said control flap housing between a closed position preventing a gas flow through said gas flow channel and at least one open position opening up said gas flow channel for accommodating a gas flow therethrough;
   a control flap seat provided on said control flap housing;
   a sealing region arranged on said control flap to bear against said control flap seat in said closed position of said control flap;
   said control flap body having a first front face and a second front face facing away from said first front face and having an external peripheral region, said first front face being positioned obliquely from radially inwardly to radially outwardly in the direction of said second front face, such that a thickness of the control flap body between said first front face and said second front face reduces from radially inwardly to radially outwardly in said external peripheral region;
   said sealing region including resilient sealing material on said external peripheral region of said control flap body;
   at least one sealing material body made with said sealing material arranged on said external peripheral region of said control flap body such as to extend in an annular manner along at least one part of said external peripheral region of said control flap body;
   said at least one sealing material body including a first sealing material body portion arranged on said first front face and a second sealing material body portion arranged on said second front face, at least one sealing material connecting portion connecting said first sealing material body portion to said second sealing material body portion; and,
   said at least one sealing material body including at least one sealing lip extending along said external peripheral region of said control flap body at said first front face on said first sealing material body portion, said at least one sealing lip bearing against said control flap seat when said control flap is in said closed position.

2. The control flap assembly of claim 1, wherein at least one applies:
   i) said at least one sealing material body includes a plurality of sealing material connecting portions arranged successively in a peripheral direction about a central region of said control flap along said external peripheral region of said control flap body; and,
   ii) said at least one sealing material body includes a plurality of sealing material connecting portions arranged in a radially staggered manner relative to said central region of said control flap.

3. The control flap assembly of claim 1, wherein said at least one sealing material body is configured in one piece with said first sealing material body portion, said second sealing material body portion and said at least one sealing material connecting portion.

4. The control flap assembly of claim 3, wherein said at least one sealing material body is configured to be integrally formed on said control flap body.

5. The control flap assembly of claim 1, wherein at least one applies:
   i) at least one sealing material connecting portion passes through an opening in said control flap body; and,
   il) at least one sealing material connecting portion encompasses an external peripheral side of said control flap body.

6. The control flap assembly of claim 1, wherein said sealing material body extends substantially along the entire external peripheral region of said control flap body and, in said closed position of said control flap, only the first sealing material body portion arranged on said first front face of the control flap body bears against said control flap seat.

7. The control flap assembly of claim 6, wherein said control flap body is configured in one piece and/or in the form of a circular disk.

8. The control flap assembly of claim 1, wherein said control flap body is borne on a pivoting shaft and said control flap is adjustable between said closed position and said at least one open position by rotating said pivoting shaft about a pivoting shaft axis (A).

9. The control flap assembly of claim 1, wherein said control flap assembly is for the gas flow in the fuel cell system in a vehicle.

10. A fuel cell system comprising:
   at least one control flap assembly including:
   a control flap housing defining a gas flow channel;
   a control flap having a disk-like control flap body and being adjustable in said control flap housing between a closed position preventing a gas flow through said gas flow channel and at least one open position opening up said gas flow channel for accommodating a gas flow therethrough;
   a control flap seat provided on said control flap housing;
   a sealing region arranged on said control flap to bear against said control flap seat in said closed position of said control flap;
   said control flap body having a first front face and a second front face facing away from said first front face and having an external peripheral region, said first front face being positioned obliquely from radially inwardly to radially outwardly in the direction of said second front face, such that a thickness of the control flap body between said first front face and said second front face reduces from radially inwardly to radially outwardly in said external peripheral region;
   said sealing region including resilient sealing material on said external peripheral region of said control flap body;
   at least one sealing material body made with said sealing material arranged on said external peripheral region of said control flap body such as to extend in an annular manner along at least one part of said external peripheral region of said control flap body;
   said at least one sealing material body including a first sealing material body portion arranged on said first front face and a second sealing material body portion arranged on said second front face, at least one sealing material connecting portion connecting said first sealing material body portion to said second sealing material body portion; and,
   said at least one sealing material body including at least one sealing lip extending along said external peripheral region of said control flap body at said first front face on said first sealing material body portion, said at least one sealing lip bearing against said control flap seat when said control flap is in said closed position.

11. The fuel cell system of claim 10, wherein said control flap assembly is for the gas flow in the fuel cell system in a vehicle.

* * * * *